(12) United States Patent
Van Phan et al.

(10) Patent No.: US 10,045,370 B2
(45) Date of Patent: Aug. 7, 2018

(54) DEVICE TO DEVICE COMMUNICATION

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI); Manivannan Thyagarajan, Coppell, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/321,173

(22) PCT Filed: Jul. 1, 2014

(86) PCT No.: PCT/EP2014/063910
§ 371 (c)(1),
(2) Date: Dec. 21, 2016

(87) PCT Pub. No.: WO2016/000755
PCT Pub. Date: Jan. 7, 2016

(65) Prior Publication Data
US 2017/0156156 A1 Jun. 1, 2017

(51) Int. Cl.
*H04W 72/04* (2009.01)
*H04W 72/12* (2009.01)

(52) U.S. Cl.
CPC ... *H04W 72/1273* (2013.01); *H04W 72/0406* (2013.01)

(58) Field of Classification Search
CPC ... H04W 76/023; H04W 8/005; H04W 92/18; H04W 72/04; H04W 72/042; H04W 72/0406; H04W 72/02; H04W 72/0413

USPC .... 455/509, 500, 517, 450, 422.1, 403, 515, 455/507, 426.1, 426.2, 550.1, 445; 370/328, 329, 252, 312
See application file for complete search history.

(56) References Cited

U.S. PATENT DOCUMENTS

| | | | |
|---|---|---|---|
| 2011/0106952 A1 | 5/2011 | Doppler et al. | |
| 2013/0258996 A1 | 10/2013 | Jung et al. | |
| 2013/0322413 A1 | 12/2013 | Pelletier et al. | |
| 2014/0237125 A1* | 8/2014 | Zhou | H04W 76/023 709/227 |
| 2014/0314009 A1* | 10/2014 | Xiong | H04W 28/16 370/329 |

(Continued)

FOREIGN PATENT DOCUMENTS

| | | |
|---|---|---|
| WO | 2011/109941 A1 | 9/2011 |
| WO | 2012/141625 A1 | 10/2012 |

OTHER PUBLICATIONS

"Introduction of ProSe", 3GPP TSG-RAN WG2 #85 Bis, R2-141859, Qualcomm Incorporated, Mar. 31-Apr. 4, 2014, 12 pages.

(Continued)

*Primary Examiner* — Keith Ferguson
(74) *Attorney, Agent, or Firm* — Squire Patton Boggs (US) LLP

(57) ABSTRACT

An apparatus and method are provided. A request is received from a first user equipment to schedule communication resources for a device to device communication between the first user equipment and at least one second user equipment. Control information relating to the device to device communication is sent to the at least one second user equipment in response to the request.

16 Claims, 7 Drawing Sheets

(56) References Cited

U.S. PATENT DOCUMENTS

2015/0215842 A1\* 7/2015 Lim ..................... H04W 40/16
370/329

OTHER PUBLICATIONS

International Search Report and Written Opinion received for corresponding Patent Cooperation Treaty Application No. PCT/EP2014/063910, dated Sep. 4, 2014, 13 pages.

\* cited by examiner

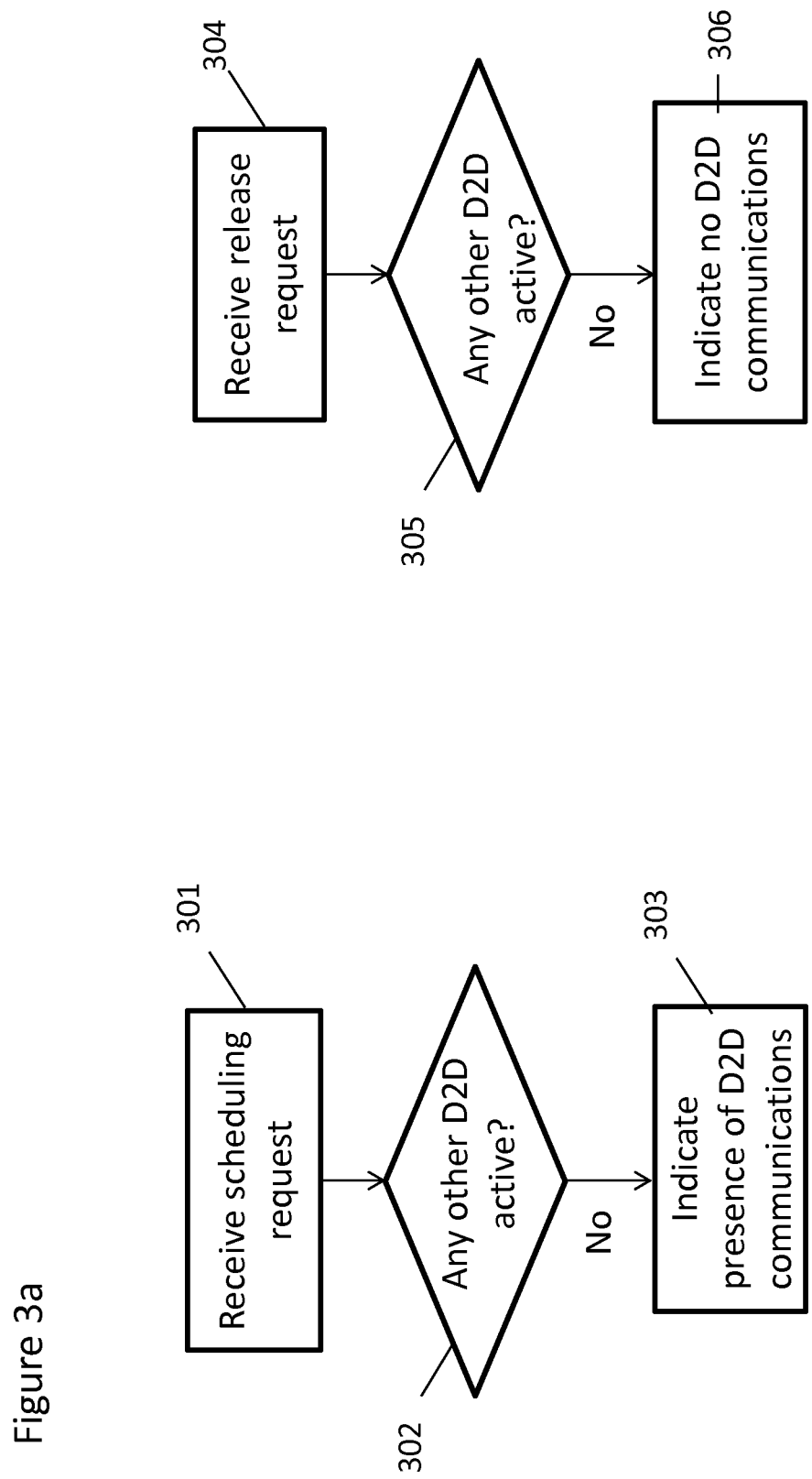

DEVICE TO DEVICE COMMUNICATION

RELATED APPLICATION

This application was originally filed as PCT Application No. PCT/EP2014/063910 filed Jul. 1, 2014.

FIELD OF INVENTION

The present disclosure relates to device to device communication and in particular but not exclusively to the provision of control information in device to device communication.

BACKGROUND

Device to Device communication occurs when devices such as user equipment (UE) communicate user data with each other directly without the user data being transmitted via a higher level network node such as a eNodeB. In such device to device communication two or more user equipment are provided with a resource pool containing resources that may be used for device to device communication. A UE initiating the device to device communication may send a scheduling assignment to a further UE indicating the resources of the pool that have been scheduled for communication between the UEs.

In a first mode of device to device communications, the resources may be scheduled by an access node. A transmitting UE (Tx UE) may request that a network node schedules resources for the communication and then provide an indication of the scheduled resources to a receiving UE (Rx UE). In this manner both the transmitting and receiving UEs are aware of the scheduling for the device to device communication. In a second mode, a transmitting UE may autonomously use or schedule the resources. The transmitting UE may indicate the scheduled resources to the receiving UE. In this manner both the transmitting and receiving UEs are aware of the scheduling for the device to device communication.

The first mode of device to device communication may be implemented where the transmitting UE is in a coverage area of the access node that schedules the resources. The second mode of device to device communication may be implemented in cases where the transmitting UE is outside or within the area of coverage of an access node however typically the transmitting UE will be outside the coverage area for the second mode. The transmitting UE may determine whether the device to device communication will be in accordance with the first mode or with the second mode, under pre-configuration and control of the serving network.

In device to device communication, a receiving UE may be aware of a resource or pool of resources on which the transmitting UE may transmit the scheduling assignment for device to device communication. The receiving UE may monitor this resource or pool of resources for the scheduling assignment. This monitoring may use energy and processing resources of the UE.

SUMMARY OF THE APPLICATION

According to an aspect, there is provided a method comprising: receiving a request from a first user equipment to schedule communication resources for a device to device communication between the first user equipment and at least one second user equipment; and sending control information relating to the device to device communication to the at least one second user equipment in response to the request The control information may comprise an indication that device to device communication is active. The method may further comprise sending control information comprising an indication that device to device communication is active in response to the request when it is determined that no other device to device communication is active for the at least one second user equipment. It may be determined that no other device to device communication is active for the at least one second user equipment if no communication resources are scheduled for device to device communication prior to receiving the request from the first user equipment. The method may further comprise: determining that scheduled communication resources for the device to device communication have been released; and sending an indication to the at least second user equipment indicating that device to device communication is no longer active if no other communication resources are scheduled for device to device communication.

The indication may be an indication of a resource pool to be monitored by the second user equipment. The resource pool may comprise a plurality of communication resources on at least one of which the sending of a scheduling assignment from the first user equipment to the second user equipment may be scheduled. The request to schedule communication resources may comprise a request to schedule at least one communication resource of a resource pool for the sending of a scheduling assignment from the first user equipment to the second user equipment. The request to schedule communication resources may further comprise a request to schedule at least one communication resource for the sending of data from the first user equipment to the second user equipment.

The scheduling assignment may provide an indication of the at least one communication resource for the sending of data from the first user equipment to the second user equipment. The method may further comprise: scheduling the requested communication resources. The method may further comprise sending a resource allocation to the first user equipment comprising an indication of the scheduled communication resources in response to the request.

The method may further comprise: sending status information to the first user equipment with the resource allocation. The status information may be indicative of when the first user equipment may send a scheduling assignment to the at least one second user equipment. The status information may be indicative of whether the control information has been sent to the at least one second user equipment. The status information may correspond to a time period that the first user equipment is to wait before sending the scheduling assignment. The status information may indicate an explicit time at which the scheduling assignment may be sent. The explicit time may be a frame number. The time period may correspond to a time at which the first user equipment detects the control information being transmitted from the access node. The method may further comprise: receiving a second request from the first user equipment to schedule communication resources for a device to device communication between the first user equipment and at least one second user equipment when no control information is detected within a further time period.

The status information may comprise the resource allocation. The status information may indicate that the first user equipment may send the scheduling assignment without a delay. When the resource allocation and status information are not sent within a first time period, the method may further comprise: receiving a second request for the resource allocation and sending the resource allocation to the first user equipment in response to the second request.

According to a further aspect, there is provided a method comprising: sending a request to a network access point to schedule communication resources for a device to device communication between a first user equipment and at least one second user equipment; and receiving a resource allocation comprising an indication of scheduled communication resources and status information indicative of when a scheduling assignment may be send to the at least one second user equipment.

The status information may be indicative of when control information relating to device to device communication will be updated at the at least one second user equipment. The method may further comprise: determining a time period for which to wait before sending the scheduling assignment.

The status information may comprise a frame number at which the scheduling assignment is to be sent. The time period may correspond to a time at which control information being transmitted to the at least one second user equipment is detected.

The request to schedule communication resources for a device to device communication between the first user equipment and the at least one second user equipment may be a request for resource allocation. The method may further comprise: waiting for a first time period after sending the request for resource allocation; and if the resource allocation is not received during the first time period: sending a second request for the resource allocation wherein the resource allocation is received in response to the second request. The status information may comprises the resource allocation. The status information may comprise the resource allocation, the time period is determined to be zero.

According to a further aspect there is provided a method comprising: receiving control information from a network access node, the control information relating to device to device communication between a first user equipment and a second user equipment and being sent to the second user equipment in response to a request from a first user equipment to schedule communication resources for a device to device communication.

The method may further comprise: monitoring a resource pool comprising a plurality of resource blocks on which a scheduling assignment may be received from the first user equipment. The control information may comprise an indication that device to device communication is active.

The method may further comprise: receiving an indication at the second user equipment indicating that device to device communication is no longer active in response to a determination by the network access node that scheduled communication resources for the device to device communication have been released and no other communication resources are scheduled for device to device communication. The indication may be an indication of a resource pool to be monitored by the second user equipment. The method may further comprise: receiving a scheduling assignment on at least one resource block of the resource pool and the indication of the resource pool indications that at least one resource block of the resource pool. The method may further comprise: receiving data from the first user equipment using device to device communication.

According to a further aspect, there is provided a network access node comprising at least one processor and a memory, the at least one processor and memory configured to: receive a request from a first user equipment to schedule communication resources for a device to device communication between the first user equipment and at least one second user equipment; and send control information relating to the device to device communication to the at least one second user equipment in response to the request.

According to a further aspect, there is provided an apparatus comprising at least one processor and a memory, the at least one processor and method configured to: send a request to a network access point to schedule communication resources for a device to device communication between the apparatus and at least one second user equipment; and receive a resource allocation comprising an indication of scheduled communication resources and status information indicative of when a scheduling assignment may be send to the at least one second user equipment.

According to a further aspect there is provided an apparatus comprising at least one processor and a memory, the at least one processor and memory configured to: receive control information from a network access node, the control information relating to device to device communication between a first user equipment and the apparatus and being sent to the apparatus in response to a request from a first user equipment to schedule communication resources for a device to device communication.

BRIEF DESCRIPTION OF THE DRAWINGS

The detailed description may make reference to the following figures in which:

FIGS. 3a and 3b are flow diagrams depicting the method steps carried out by the access node and Tx UE according to a first and second aspect;

DETAILED DESCRIPTION

The following description makes reference to device to device communication taking place between two user equipment. In the following, the user equipment (UE) that initiates the device to device communication is referred to as the transmit (Tx) UE and the UE with which the communication is initiated is referred to as the receive (Rx) UE. It will be appreciated that this is for clarity purposes only and each UE may be capable of carrying out the functionality of both the transmitting and receiving UE.

The Tx UE may initiate communication with the Rx UE by transmitting a scheduling assignment (SA) to the Rx UE. The scheduling assignment may indicate or schedule the resources over which communication between the Tx UE and the Rx UE may take place. The scheduling assignment sent from the Tx UE to the Rx UE may indicate the resource to be used for device to device communication.

The Rx UE may additionally be aware of a resource or pool of resources over which the Tx UE may transmit the scheduling assignment (SA). The Rx UE may monitor this resource or pool of resources for a SA from the Tx UE. Once the Rx UE has received the SA, it may monitor the resources indicated in the SA for communication of data, for example user data, from the Tx UE.

A first mode of device to device communication may take place when an access node of a network schedules the device to device communication for a Tx UE. The access node may schedule the device to device communication by providing a resource allocation to the Tx UE. This first mode of device to device communication may be implemented where the Tx UE is in the coverage area of a cell served by the access node.

In a second mode of device to device communication, the Tx UE may schedule the resources to be used for device to device communication and indicate these resources to the Rx UE with a scheduling assignment. Similarly to the first mode, in the second mode the Rx UE will monitor a pool of resources for the scheduling assignment. Embodiments of the present disclosure are primarily concerned with the first mode of device to device communication.

Figure 1:
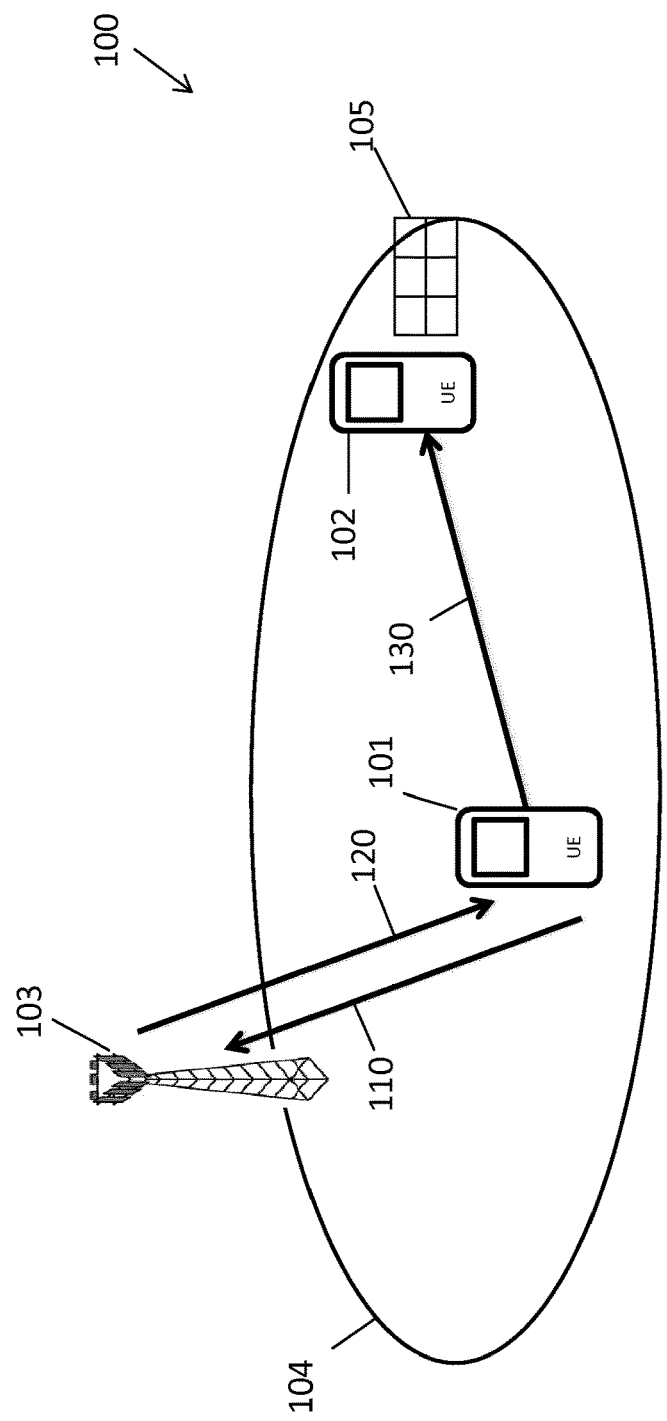
FIG. 1 is an example of a network in which device to device communication may be implemented.

FIG. 1 shows an example of a network in which the first mode of device to device communication is taking place and both the Tx UE and the Rx UE are within the coverage area of the network access node 103. It will however be appreciated that in the first mode of device to device communication, the Rx UE may or may not be within the coverage area.

FIG. 1 shows a network 100 comprising a first UE (Tx UE) 101, a second UE (Rx UE) 102 and a network access node 103. The Tx UE 101 and Rx UE 102 are in a coverage area (cell) 104 of the access node 103. FIG. 1 additionally shows the messaging steps 110, 120 and 130 carried out by the Tx UE 101, Rx UE 102 and the access node 103 in device to device communication.

The Tx UE 101 may send a device to device scheduling request to the access node 103 shown by the signal 110. The device to device scheduling request may request that the access node 103 provide an indication of the resources that the Tx UE 101 may use for device to device communication.

In some examples the device to device scheduling request may comprise the Tx UE sending a buffer status report to the access node 103. The buffer status report may indicate the state of one or more buffers of the Tx UE in which data to be sent to the Rx UE is stored. For example the buffer status report may indicate, to the access node, the amount of data that the Tx UE is requesting to send to the Rx UE. The access node may therefore schedule resources for the transmission of the amount of data indicated in the buffer status report.

It will be appreciated that in some embodiments, the buffer status report is scheduled on an uplink communication channel used by the Tx UE to communicate with the access node. For example, the TX UE may send a one bit indication to the access node to ask for a scheduling allocation in the uplink for the Tx UE to send the buffer status report to the access node. However it will be appreciated that this is by way of example only and the scheduling of the buffer status report may be network dependent.

In response to the request 110 from the Tx UE 101, the access node 103 may schedule first resource blocks to be used for device to device communications and provide an indication of the scheduled first resource blocks (resource allocation) to the Tx UE at step 120. The access node 103 may also schedule one or more second resource blocks for the transmission of a scheduling assignment from the Tx UE 101 to the Rx UE 102 and these second resource blocks are included in the resource allocation 120. The scheduling may indicate the scheduled first resource blocks to the Rx UE. Thereafter, the Rx UE 102 may monitor the first resource blocks (indicated by the scheduling assignment) for the transmission of user data from the Tx UE 101.

The first resource blocks may be scheduled for the Tx UE 101 to transmit the user data identified in the buffer status report to the Rx UE 102. The first resource blocks may be indicated by the Tx UE 101 to the Rx UE 102 by the transmission of a scheduling assignment from the Tx UE to the Rx UE. The access node may schedule one or more second resource blocks for the transmission of the scheduling assignment. The access node may therefore schedule first resource blocks for the transmission of data and schedule second resource blocks for the transmission of a scheduling assignment and provide an indication of the first and second resource blocks to the Tx UE 101 in the form of a resource allocation message.

Once the Tx UE 101 has received the indication of the scheduled resource blocks (which may be in the form of a resource allocation from the access node 103), the Tx UE 101 may transmit a scheduling assignment comprising an indication of the first resource blocks to the Rx UE 102. The scheduling assignment will be transmitted using the second resource blocks.

At step 130, the Tx UE 101 may send a scheduling assignment to an Rx UE 102. It will be appreciated, that if the Tx UE 101 is sending data to more than one Rx UE 102, it will send the scheduling assignment to all the Rx UEs. It will be appreciated then that while the foregoing refers to a Rx UE 102, all relevant Rx UEs (of the same targeted UE group) may receive the scheduling assignment and then user data from Tx UE. The scheduling assignment may indicate to the Rx UE 102, the (first) resource blocks on which the Tx UE 101 is to transmit data.

The Rx UE 102 may be preconfigured with a resource pool 105 on which a scheduling assignment may be received. For example the Rx UE 120 may be preconfigured with a resource pool comprising the second resource blocks. In other words, the access node may select the one or more second resource blocks for the transmission of the scheduling assignment from the pool of resource blocks available to the Rx UE 102. The resource pool 105 may comprise a plurality of resource blocks that are available to the access node to schedule the transmission of a scheduling assignment between the Tx UE 101 and the Rx UE 102.

Even though the Rx UE 102 may not be aware of a particular resource block on which the Tx UE 101 is to send a scheduling assignment (SA), the Rx UE 102 may monitor the pool of resources to which this resource block belongs. Once the Rx UE 102 has received a scheduling assignment from the Tx UE 101, the Rx UE 102 will be aware of the first resource blocks on which the Tx UE 101 is to transmit data and can monitor the resource blocks accordingly. In scheduling the scheduling assignment from the Tx UE to the Rx UE, the access node may select one or more resource blocks from the pool of resource blocks preconfigured at the Rx UE. It will be appreciated that the resource blocks used for data transmissions between the Tx UE 101 and the Rx UE 102 may not be a part of the configured resource pool for transmission and reception of scheduling assignments.

While the first mode of device to device communication may be implemented when a Tx UE is within the coverage area of an access node, the Rx UE may be within the coverage area or out of the range of the coverage area. The Rx UE need only be within the range of the TX UE. In the above example, the Rx UE 102 may not have any communication with the access node 103.

In embodiments of the present disclosure, an access node may be used to provide control information relating to device to device communication to the Rx UE when the Rx UE is in the coverage area of the access node. It will be appreciated that in embodiments, the Tx UE will also be within the coverage area of an access node. In further embodiments, a mechanism for allowing a Tx UE to wait until the control information has been sent before initiating device to device communication is introduced.

In a first aspect, the control information may comprise an indication from an access node of whether or not device to device communications are currently being carried out in the range of a Rx UE. This control information may trigger the Rx UE to monitor or stop monitoring a pool of resource blocks for scheduling assignments from a Tx UE. A reduction in the monitoring carried out by a UE may provide power savings.

In an example embodiment of the first aspect, an Rx UE in the coverage area of a first access node may be provided with control information from the first access node comprising an indication that device to device communication is active for that Rx UE. In this case, the Rx UE may monitor a resource pool for communication from a Tx UE in response to the indication. In a further example, the Rx UE may be provided with an indication that device to device communication is not active for the Rx UE and in some examples may stop monitoring a resource pool for communication from a Tx UE in response.

In a second aspect of the present disclosure, the control information provided from an access node to an Rx UE may comprise an indication of a resource pool on which scheduling assignments can be scheduled. For example, instead of being fixed and preconfigured, a resource pool may be indicated to the Rx UE from the access node. The control information may comprise an updated or modified resource pool comprising resource blocks on which the scheduling assignments may be scheduled. An Rx UE in the coverage area of a first access node may be provided with an indication of a pool of resources on which the scheduling assignment from a Tx UE may be scheduled. In this manner, the resource pools may be modified or updated according to the characteristics, such as traffic load, of the network.

It will be appreciated that in some embodiments, the first and second aspects may be combined and control information comprising an indication that device to device communication is being carried out as well as control information relating to the resource pool may be provided to a Rx UE and a Tx UE.

It will be appreciated that in some implementations of the first and/or second aspects, the sending of the control information may be triggered by a request from the Tx UE to the access node to schedule resources for device to device communication. In such a case there is a period of time between the Tx UE sending the request and the Rx UEs receiving the control information.

According to a third aspect, a mechanism is introduced for causing the Tx UE to wait for a period of time allowing the control information to the be sent to Rx UEs before the Tx UE may initiate device to device communication (for example by sending a scheduling request).

In response to a scheduling request from a Tx UE, the access node may provide a resource allocation and status information relating to control information sent to the Rx UEs. The Tx UE may determine whether the control information is current in dependence on the status information and send a scheduling assignment when it is determined that the control information is current. In a first embodiment the status information may comprise an explicit time at which the scheduling assignment may be sent. In a second embodiment, the status information may comprise an indication that the scheduling assignment may be sent when control information is detected by the Tx UE. In a third embodiment, the reception of the resource allocation may indicate that the control information is current.

In the third embodiment of the third aspect, the access node may determine whether the Tx UE needs to wait for current control information to be sent and may only send the resource allocation once the control information has been sent. The Tx UE may be configured to wait for a time period after sending the scheduling request and if no resource allocation is received during that time period, re-send the scheduling request. The time period may be based on an explicit time T or may correspond to the detection of control information being sent by the access node and detected by the Tx UE.

It will be appreciated that while the foregoing has described three aspects, in embodiments these aspects may be combined.

Figure 2:
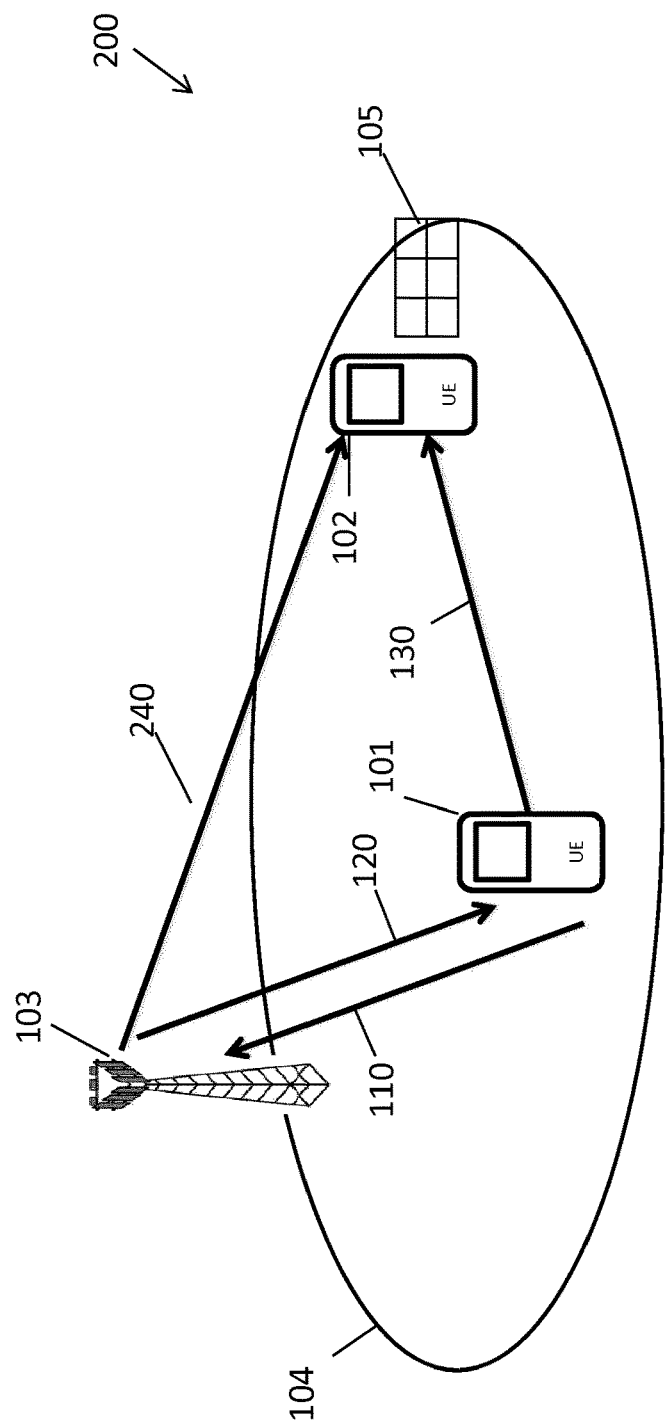
FIG. 2 is an example of a network in accordance with a first and a second embodiment.

FIG. 2 shows an example of embodiments of the present disclosure where control information is provided from an access node to an Rx UE. It will be appreciated that in the example of FIG. 2, the Tx UE and Rx UE are both in the coverage area of an access node, however in some embodiments, the Tx UE and Rx UE may be in the coverage area of different access nodes while still being within a device to device communication range of each other. It will be appreciated that in some respects FIG. 2 is similar to FIG. 1 and like reference numerals indicate like.

In addition to the features of FIG. 1, FIG. 2 includes a message 240 from the access node serving the Rx UE to the Rx UE. The message 240 may comprise control information relating to the device to device communication. In a first aspect, the control information may comprise an indication that device to device communication has been initiated within range of the Rx UE. In a second aspect, the control information may comprise an indication of a resource pool that may be monitored by the Rx UE for scheduling assignments from the Tx UE. It will be appreciated that the control information may comprise both the control information of the first and second aspects and/or a combination of such control information.

It will be appreciated that the message 240 may be signalled to the Rx UE in accordance with the network in which the Tx UE is implemented. In one example, the message 240 may be signalled using L3 common control signalling, such as broadcast system information, to deliver the message 240 to all of the Rx UEs in the coverage of the access node. In another example L2/L3 dedicated signalling toward individual Rx UEs may be used when Rx UEs are in RRC CONNECTED state (i.e., connected to the access node). In this manner specific ones of the Rx UEs may be signalled to.

In another example a designated L1 downlink common reference signal may be used for all Rx UEs in a cell coverage area for carrying an indication of whether device to device communication in the first mode is active around Rx UE. In another example, an existing DPCCH may be used for a more dedicated control of individual Rx UEs in RRC CONNECTED mode. The L1 realization option may provide quick signalling but may not flexible to cope with large amounts of control information (for example the L1 signalling may be suitable for a few bits of information).

It will be appreciated that many options exist for the signalling of the control information and a suitable option may be implemented according to the amount of control information signalled, the type of network and characteristics of the network such as signal quality, interference and load.

Embodiments according to a first aspect of the present disclosure on will now be described with reference to FIG. 2 and to the flow diagrams of FIGS. 3a and 3b.

In the first aspect, the control information provided to the Rx UE from the access node may comprise an indication of device to device communication being carried out within range of the Rx UE. In one example, the control information may indicate that device to device communication has been initiated, for example through the reception of a scheduling request from the Tx UE. If there are no other scheduling requests, then an indication that device to device communication has been initiated is sent to the Rx UE at 240.

In order to receive a scheduling assignment from the Tx UE 101, the Rx UE 102 may monitor a resource pool 105 comprising resource blocks on which the scheduling assignment may be received from the Tx UE 101. The Tx UE 101 is only able to send a scheduling assignment to the Rx UE 102 once the access node 103 has scheduled resources for the device to device communication and provided a resource block to be used for the transmission of the scheduling assignment in the resource allocation 120. The reception of a scheduling request at the access node from the Tx UE may indicate that the Tx UE is requesting to transmit a scheduling assignment to the Rx UE. The reception of the scheduling request at the access node may therefore trigger an indication for an Rx UE 102 that is not already monitoring to start monitoring the resource pool for a scheduling assignment from the Tx UE 101.

Conversely, the Tx UE 101 may send an indication to the access node 103 that it is no longer carrying out device to device communication. This may for example be in the form of a release message for the release of the schedules resources used by the Tx UE 101 in device to device communication. If there is no other active device to device communication in the range of the Rx UE, this may trigger an indication to be sent to the RX UE 102 for it to stop monitoring for a scheduling assignment from a Tx UE.

In the example of FIG. 2, both the Tx UE 101 and the Rx UE 102 are in the coverage area of the access node. In this example the access node may provide an indication to the UEs in the coverage area, that device to device communication is taking place, for example in response to a device to device scheduling request being received at the access node when no other device to device requests are active. Alternatively or additionally, the access node may provide an indication that device to device communication has ceased, for example in response to a release message from a UE indicating that the resources used for device to device communication have been released and there being no other active device to device communication.

It will however be appreciated that in some cases, a TX UE may be in the coverage area of a first access node and the Rx UE may be in the coverage area of a second access node. The Tx UE and Rx UE however may be within a device to device communication range with each other, for example one or both of the Tx UE and the Rx UE may be on a cell edge. In this case, a scheduling request to the first access node from the Tx UE may trigger an indication to be sent to the Rx UE, with the indication being sent from the first access node to the Rx UE via the second access node.

Figure 3B:
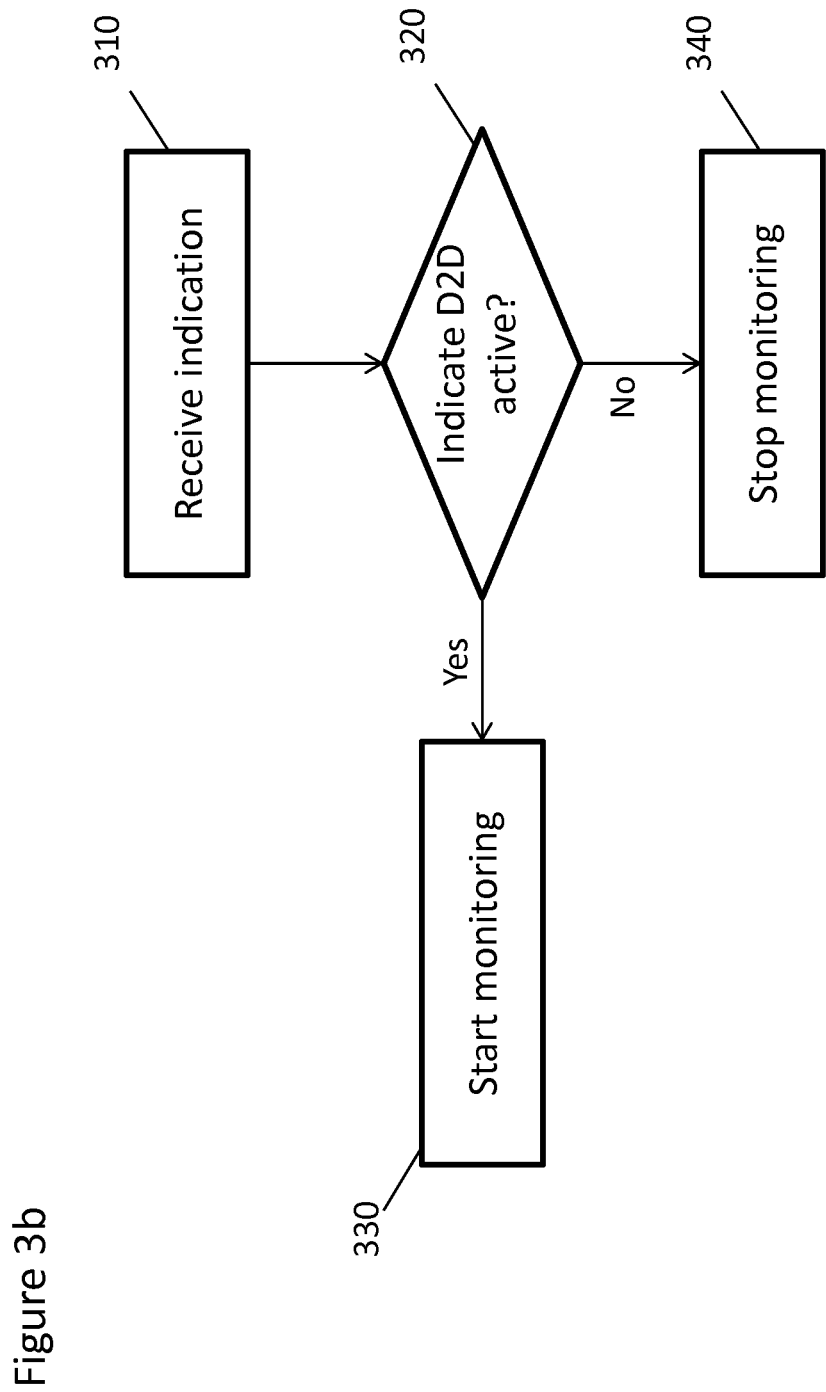

FIGS. 3a and 3b show an example of the method steps carried out in accordance with an example of the first aspect.

FIG. 3a shows an example of the method steps carried out by an access node (or in the case of the Rx and Tx UEs being in different coverage areas—two access nodes). Steps 301, 302 and 303 are the method steps carried out in response to the access node 103 receiving a scheduling request from a Tx UE 101. Steps 304, 305 and 306 are the method steps carried out in response to an access node receiving an indication (such as a resources release request) from the Tx UE that device to device communication is no longer being carried out.

At step 301, the access node 103 receives a scheduling request from a Tx UE 101. At step 302, the access node 103 determines whether any other device to device communication is currently scheduled. For example, the access node 103 may have responded to a previous scheduling request from another Tx UE by scheduling resources for communication and those resources may not yet have been released.

If there is no other active device to device communication, the method proceeds to step 303 where an indication is sent to the Rx UE to trigger it to start monitoring the resource pool 105 for scheduling assignments from the Tx UE. In other words, the access node determines whether the Rx UEs are already monitoring and if they are not, triggers the Rx UEs to start monitoring.

If another device to device communication is active (resources are scheduled) the method will end. In this case, it is likely that the access node sent an indication to start monitoring to a Rx UE in response to the prior request and thus the Rx UEs are already monitoring for scheduling requests from Tx UEs.

The indication may be send to the UEs for example via a broadcast signal. In some embodiments, the indication may be explicit, for example a bit that is set to indicate that device to device communication is being carried out. In another example, the indication may be implicit, for example, the access node may indicate a resource pool to be used for device to device communication in accordance with a second aspect of this disclosure to the UEs and this may imply that the Rx UE is to start monitoring. The indication of the resource pool may implicitly indicate that device to device communication is taking place. It will be appreciated that the indication (for example steps 303 or 306) may include status information about the device to device communication.

Steps 304, 305 and 306 relate to an indication that device to device communication is no longer taking place.

At step 304, the access node may receive a message from a UE indicating that the resources used for device to device communications are being released, for example the communication may be finished. At step 306, the access node 103 may determine whether there are other active device to device communications. It will be appreciated that this may be similar to step 302.

If other device to device communications are active, the method may end. In this case, the Rx UE continues to monitor for scheduling assignments as other Tx UEs may send scheduling assignments. If there is no other device to device communications, the method may process to step 306 where an indication to stop monitoring is sent to the Rx UE. In this case, the release message received at 304 indicated that the last device to device communication resources are being released and thus there are no active Tx UEs that can send a scheduling assignment to the Rx UE.

It will be appreciated that the indication sent at step 306 may be explicit, for example with the setting of an explicit bit in the indication. Alternatively, the indication may be implicit, for example an indication that the resource pool provided is no longer valid. In some embodiments the indication may be broadcast by the access node, for example as part of system information over a broadcast control channel however it will be appreciated that the indication may be signalled differently in accordance with the network capabilities.

FIG. 3b shows an example of the method steps that may be carried out by a UE on receipt of an indication 303, 306 of whether or not device to device communication is taking place. It will be appreciated that the example of FIG. 3a covers a case where the access node may provide an indication that device to device communication has started taking place and an indication that device to device communication is no longer taking place.

At step 310, the UE may receive an indication regarding device to device communication. In accordance with the example of FIG. 3a, this indication may be implicit or explicit. At step 320, if the indication indicates that device to device communication has been initiated, the method proceeds to step 330 where the UE will start monitoring that resources on which a scheduling assignment may be received. If the indication indicates that there is no active device to device communications in the range of the UE, then the method proceeds to step 340 where the UE stops monitoring resources for a scheduling assignment.

In the examples of FIGS. 3a and 3b, when the access node determines that the last active device to device communication is being released, the access node may indicate to the Rx UE that device to device communication is no longer active. The foregoing has described the Rx UE stopping the monitoring of the resource pool for scheduling assignments from a Tx UE as an example response to the indication that device to device communication is no longer active. It will however be appreciated that this is by way of example only and the Rx UE, in response to receiving the indication that there is no active device to device communication in the first mode from the access node, may have another response to such an indication. In a further example, the Rx UE which may be an authorized Tx UE in the second mode may then use the resource pool that had previously been reserved for the first mode of device to device communication for the second mode of device to device communication, in particular, to transmit scheduling assignments for the second mode.

In this further embodiment, the indication from the access node to the Rx UE may explicitly indicate that the resource pool may be used in the second mode of communication or an indication that the first mode of device to device communication is not active may imply that the resource pool may be used for the second mode of device to device communication.

The Rx UE 102 may receive an indication that there is no active device to device communications (in the first mode) as at step 320 and that the resource pool may be used for the second mode. In one example, the Rx UE may then forward an indication of the resource pool that may be used for device to device communication in a second mode to further UEs that may be capable of device to device communication in the second mode but may not be within the coverage area of the access node 103. The Rx UE 102 may additionally or alternatively carry out the functionality of a Tx UE in a second mode of device to device communication. In other words, the Rx UE 102 may become a Tx UE in accordance with the second mode. The second mode Tx UE may schedule resources for communication and then send the scheduled resources to another UE by sending a scheduling assignment in accordance with the second mode. The other UEs may be monitoring the resource pool (identified to it by the access node or by the Rx UE 103) for scheduling assignments from Tx UEs operating in accordance with the second mode.

In another implementation option, an explicit indication, for example the using 1 additional bit, can be introduced to indicate whether the resource pool indicated to receive scheduling assignment of the first mode can be used for transmitting scheduling assignments of the second mode or not when there is no active D2D communications in the first mode.

It will be appreciated that in the example where both a Tx UE and a Rx UE are in the coverage area of the same access node, an access node will receive a message from the Tx UE (for example message 301 or 304) and then provide an indication (steps 303 or 306) to the Rx UE. If however, the Tx UE and the Rx UE are in the coverage area of different access nodes but are within device to device communication range of each other, the access node serving the Tx UE will receive a message (steps 301 and 304) and provide an indication to the serving access node of the Rx UE (steps 303 and 306). The serving access node of the Rx UE may then provide the indication to the Rx UE.

In a second aspect, the control information 240 of FIG. 2 may comprise an indication of a resource pool over which device to device communication may be scheduled.

Referring again to FIG. 2, the message 240 may comprise an indication of a resource pool available to the Rx UE for the reception of a scheduling assignment from a Tx UE. In some embodiments, the indication of the resource pool 240 may be an update or modification to the resource pool 105. In other or additional embodiments, the indication of the resource pool 240 may be an indication of a new, first or replacement resource pool 105.

In one example, the indication of the resource pool 240 may be triggered by the scheduling request 110 from the Tx UE, however it will be appreciated that the indication 240 may be triggered by another event and/or may be sent periodically or at set times by the access node.

For example, the access node may send the indication 240 when a cell load of the cell 104 reaches a threshold, for example due to a large amount of traffic in the cell. In this case, the access node may for example reduce the size of resource pool 105 for device to device communication.

In an example where the indication 240 is triggered by a scheduling request from the Tx UE 101, it will be appreciated that the indication 240 may not be triggered by every scheduling request 110. For example, the access node 103 may reserve certain resources for device to device communication based on a first scheduling request and only update, modify or change the resource pool 105 if the subsequent scheduling requests (from the Tx UE or other Tx UEs in the cell) exceed the size of reserved resource for device to device communication.

It will also be appreciated that the indication of the resource pool 240 may take any suitable form. For example, the resource pool may be given by a set of predefined channel indexes. In another example, the pool can be given by some parameters or limits and the Rx UE may be configured to derive channel resolutions for monitoring scheduling assignments from there. The format of the indication 240 may be a time- and frequency domain resource (e.g. physical resource blocks in frequency domain and sub-frames in time domain).

It will be appreciated that the indication 240 will be sent by the access node 103 serving the Rx UE 102. The Rx UE 102 on receipt of the indication 240 may update, modify or replace the resource pool 105.

It will also be appreciated that, in some examples, the initial resource pool 105 may be preconfigured at the Rx UE and the indication 240 may include a modification or update to the preconfigured resource pool.

It will be appreciated that in some examples the first and second embodiments may be combined. For example the access node may provide an indication of whether device to device communication is taking place to a Rx UE. This indication may be provided with the indication of the resource pool in some embodiments. In other embodiments, for example where the indication of the resource pool is sent periodically, at step times or triggered at events other than a scheduling request, the indication of the resource pool and the indication of whether device to device communication is taking place may be sent separately.

In the foregoing examples the scheduling request may trigger the sending of control information from the access node to the Rx UE. It will be appreciated that this control information may comprise an indication according to the first aspect, the second aspect or any combination thereof. It will also be appreciated that in some cases not every scheduling request will trigger the sending of the control information. For example, the control information may be triggered when the scheduling request is a first scheduling request (in that prior to the scheduling request no device to device communication was being carried out).

In the case where the scheduling request 110 triggers the sending of the control information to the Rx UEs, there may be a period of time between the reception of the scheduling request at the access node and the time at which the Rx UE have received the control information. The Tx UE sending a scheduling assignment to the Rx UEs during this period may result in an error. For example when the control information is an indication according to the first aspect, the Tx UE may send the scheduling assignment before the Rx UEs have started monitoring. If the control information is an indication according the second aspect for example, the Tx UE may send a scheduling assignment before the Rx UEs are aware of their updated resource pools.

A third aspect of the present disclosure is a mechanism to control the timing of the scheduling assignment so that the scheduling assignment is sent after the control information has been sent and received by the Rx UEs.

In embodiments of the third aspect, in response to a scheduling request 110, the access node 103 may provide a resource allocation 120 to the Tx UE. The resource allocation may additionally include status information (which may be explicit or implied by the resource allocation itself) which indicates to the Tx UE when control information for the Rx UEs will be updated.

In a first embodiment, the status information may comprise an explicit indication, indicating a time at which the Tx UE may transmit a scheduling assignment to a Rx UE. This explicit indication may be for example a sub frame number at which the Tx UE may transmit. In a second embodiment, the status information may be implicit, indicating that the Tx UE is to monitor for control information and may transmit the scheduling assignment once the control information is sent. In a third embodiment, the reception of the resource allocation 120 at the Tx UE may indicate that the scheduling assignment 130 may be sent. In the third embodiment, the access node may send the resource allocation 130 after it has sent the control information to the Rx UEs. In the third embodiment, the Tx UE may be configured to wait for a resource allocation 120 for a period of time after sending a scheduling request 110. If the resource allocation 120 is not received within the period of time, the Tx UE may resend the scheduling request.

Figure 4B:
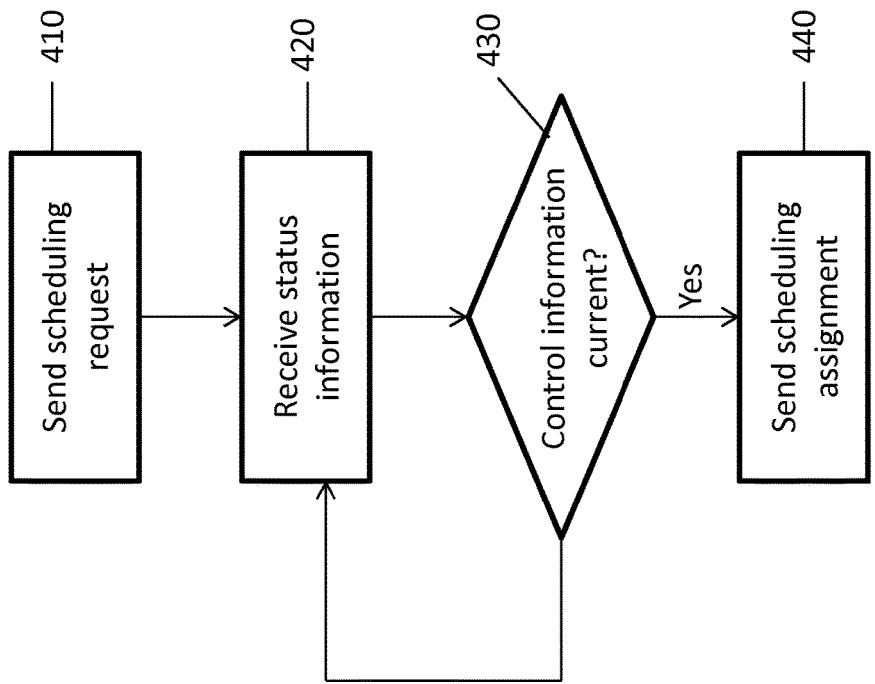
FIGS. 4a, 4b and 4c are flow diagrams depicting the method steps carried out by the access node and Tx UE in according to a third aspect.
Figure 4A:
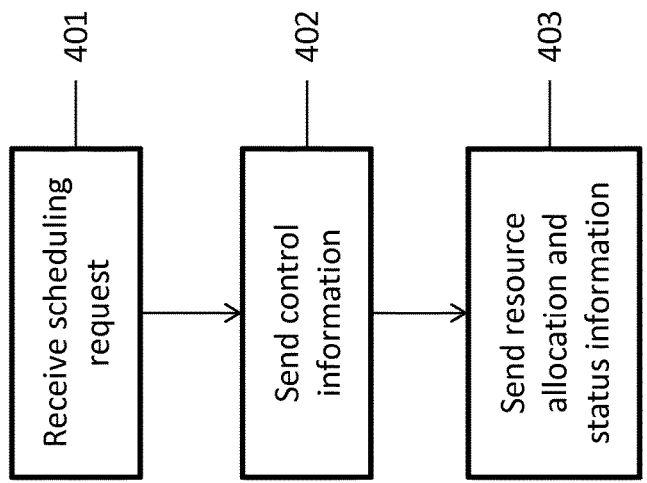

FIGS. 4a and 4b are flow diagrams depicting the method steps carried out by embodiments of the third aspect by the access node and Tx UE respectively.

At step 401, the access node 103 receives a scheduling request from the Tx UE 101. At step 402, the access node 103 may send control information 240 to one or more Rx UE 102. At step 403, the access node 103 may send a resource allocation 120 and status information to the Tx UE 101. In some examples, the resource allocation 120 and status information may be sent together.

FIG. 4b shows the method steps associated with the Tx UE 101. At step 410, the Tx UE 101 sends a scheduling request 110 to the access node 103. At step 420, the Tx UE 101 receives a resource allocation 120 and status information of the control information of the Rx UE 102. It will be appreciated that in some examples the status information may be received as part of the resource allocation 120.

At step 430, the Tx UE 101 may determine whether the control information at one or more Rx UEs 102 has been updated. If the control information is up to date, the TX UE 101 may send a scheduling assignment 130 to the Rx UEs 102. If the Tx UE 101 determines that control information is not current, the method may proceed to step 410 where the Tx UE sends another scheduling request to the access node.

The status information may indicate to the Tx UE 101 when the control information will be current and thus the determination of whether the control information is current is based on the status information.

In a first embodiment, the status information may be explicit—for example the status information may comprise a frame number at or after which the Rx UE will have updated control information. A Tx UE 101 initiating device to device communication (for example sending the scheduling request) at or after the frame number can assume that the control information of the Rx UE includes or corresponds to the control information of the Tx UE. For example, the frame number may indicate the frame number at which the Rx UE will be monitoring a resource pool for scheduling requests from the Tx UE and/or may indicate the frame at which a resource pool being monitored will include the one or more resource blocks used to transmit the scheduling request. The frame number may indicate the frame number at or after which the Tx UE may transmit a scheduling request to the Rx UE.

In a second embodiment, the status information may include information relating to the timing of the indication of the resource pool 240. For example the timing information may include an indication of the last time at which an indication of the resource pool was sent. The Tx UE may determine from this information whether the resource pool at the Rx UE is current, or whether the Tx UE may wait before sending. The Tx UE may for example have a pre-configured time period in which to determine that the resources have been updated at the target (Rx) UE and that the Tx UE may initiate device to device communication.

For example, the Tx UE may base the determination 430 on one or both of i) that the access node has started to indicate that device to device communication is taking place and ii) that the resource pool of the Rx UE corresponds to the updated resources allocated to the Tx UE by the access node. In this embodiment, the Tx UE may be able to receive the control information sent to the Rx UEs at 240.

In a third embodiment, the reception of the resource allocation 120 may indicate that the control information is current. For example, in the third embodiment, the access node may only send the resource allocation 120 after the control information has been sent to the Rx UEs 102. In examples of the third embodiment, a Tx UE may wait for a period of time after sending a scheduling request 110. If a resource allocation 120 is not received in that period of time, the Tx UE 101 may resend the scheduling request.

Figure 4C:
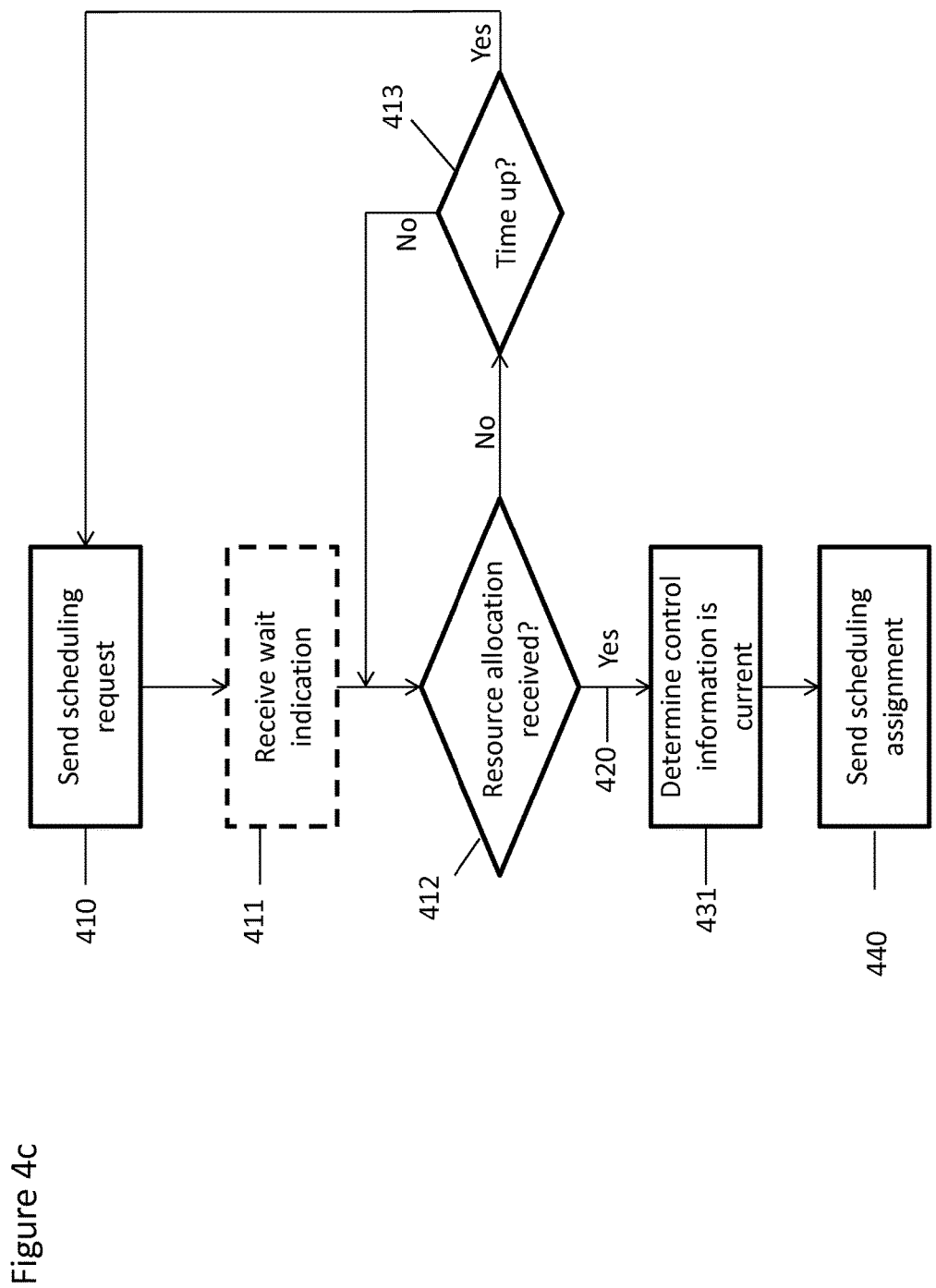

FIG. 4c is an expansion of the method steps carried out by a Tx UE in accordance with the third embodiment of the third aspect. At step 410, the Tx UE may send a scheduling request to an access node. In this embodiment, the access node (or network via the access node), upon reception of the scheduling request from the Tx UE 101, may determine whether the requesting Tx UE 101 needs to wait for control information to be sent to the Rx UE(s). For example, if an indication that device to device communication in the first mode is active and/or resource pool for reception of scheduling assignment in the first mode towards receiving UEs in the coverage area of the access node is updated.

If the determination is that the Tx UE is to wait, then the access node may only send a resource allocation 120 to the Tx UE 101 once the control information is current/updated. The access node may optionally send an indication to the Tx UE 101 at 411 however in other embodiments the Tx UE may be preconfigured to wait. The indication 411 or preconfigured setting of the Tx UE 101 may indicate to the Tx UE the period for which the Tx UE is to wait.

At step 412, it is determined whether a resource allocation 120 has been received from the access node 103. If the resource allocation has not been received, the method proceeds to step 413 where it is determined whether the time period for waiting has passed. If it has, the method proceeds to step 410 where a scheduling request is resent to the access node. If the time period has not passed, the method proceeds to step 412.

Once the resource allocation is received, this provides an indication that the control information is current which is determined at step 431. This may correspond to step 430 of FIG. 4b. The method may then proceed to step 440 where a scheduling assignment is sent.

The Tx UE has been described as waiting for the resource allocation 120 for a period of time 413 before re-sending a scheduling request if a resource allocation 120 is not received.

In one example, the waiting period may correspond to a predefined timer denoted as T with a preconfigured maximum duration of the waiting period. This waiting period may correspond to a time taken to update the control information and in one example may be 200 milliseconds. In an example, the Tx UE may receive an indication to wait at step 411. Upon receiving the waiting indication from the access node, the timer T may be started at the Tx UE. During T, if the access node allocates resources for the Tx UE to transmit in the first mode (sends a resource allocation 120), the Tx UE may stop the timer T and starts using the allocated resources for transmission. If T expires and no resource allocation is received from the access node, the Tx UE may resend the scheduling request with updated buffer status report. It will be appreciated that the Tx UE may be preconfigured to wait and step 411 may be omitted.

In another example, the waiting period may be determined by the Tx UE monitoring the sending of control information from the access and determine to resend the scheduling request 110 upon detecting the sending of control information when no resources allocation has been received. It will be appreciated that the Tx UE in this example may be capable of receiving or detecting the transmission of control information from the access node. In this aspect, it will be appreciated that the time up determination 413 will correspond to the detection of the sending of control information.

In some further embodiments of the third aspect, during the waiting time, the Tx UE may remains in RRC CONNECTED state and may use the second mode (autonomous device to device communication) for example. The network may configure the Tx UE to use the second mode during the waiting time, either implicitly or explicitly. The implicit option can be specified via advanced pre-configuration (pre-configured rule). The explicit option can be realized with explicit indication to the Tx UE along with the indication telling the Tx UE to wait for resource allocation for the first mode.

With reference to the first aspect, it will be appreciated that the indication sent to the Rx UE may be implicit. In a case where the first and the second embodiments are combined, the implicit indication may be whether the access node indicates a resource pool 105 to the Rx UE. If the access node indicated a resource pool (for example an updated, modified or new resource pool) to the Rx UE, this implies that the Rx UE is to monitor for a scheduling assignment from the Tx UE.

In the foregoing it has been described that the Tx UE may be in a different cell to the Rx UE and the Tx UE and Rx UE may be served by different access nodes. The Tx UE and Rx UE may be within a device to device range with each other and may still implement a first mode of device to device communication. In this case, the access node serving the Tx UE may transmit the indication of the resource pool and/or indication of whether device to device communication is taking place to the access node serving the Rx UE. The access node serving the Rx UE may then provide this indication(s) to the Rx UE.

In such a case, neighbouring cells (or access nodes) may exchange and coordinate the status of device to device activities (for example, loads) in their cells and indicate that to Rx UEs. The coordination and indication of resource pools of neighbouring cells may also be implemented so that a Rx UE in one cell may be able to have device to device communication with a Tx UE in another neighbouring cell.

In such an example, a two bit indication may be configured, one for Rx UEs in the same cell as the Tx UE cell and another one for Rx UEs in neighboring cells. Only Rx UEs in the neighbouring cells that are on the cell edge will check the second bit indication and monitoring the device to device transmissions of the cell having the Tx UE accordingly.

It will also be appreciated that embodiments of the present application may be applicable cases where two or more cells served by a same access node are associated with a pool of resources for device to device communication. In this case, the cell 140 of FIG. 1 may comprise two or more of the cells supported by the access node 103. In other examples, two or more cells may have separate pools of resources. In this case, the access node may indicate to Rx UEs on an edge of the cell, the resource pool 105 of both the cell it is in and neighbouring cells in which potential Tx UEs are.

In these multi-cell scenarios, for example, if an explicit starting time (frame number) is indicated to a Tx UE in a first cell, the resource pool update timing of a second cell (including a Rx UE) can be taken into account when starting time is setting. The Tx UE may transmit device to device communication in an adjusted time corresponding to when/after Rx UEs in second cell start monitor the right pool for device to device communication.

It will be appreciated that while in the foregoing one Tx UE and one RX UE is described, it will be appreciated that there may be multiple UEs in each cell. The indications 240 may be broadcast to the multiple Rx UEs in the cells and a Tx UE may communicate with multiple Rx UEs.

Figure 5:
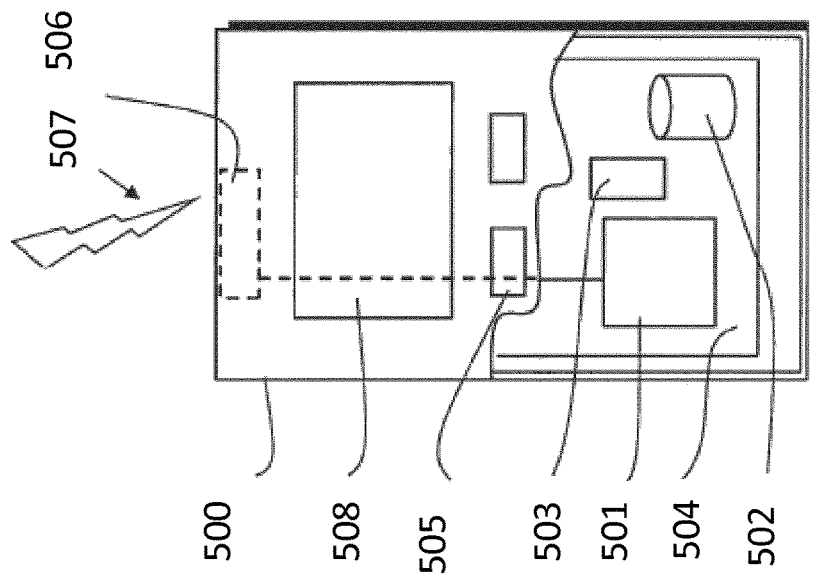
FIG. 5 shows an example of a device.

A possible communication device will now be described in more detail with reference to FIG. 5 showing a schematic, partially sectioned view of a communication device 500. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 500 may receive signals over an air or radio interface 507 via appropriate apparatus for receiving and may transmit signals via appropriate apparatus for transmitting radio signals. In FIG. 5, a transceiver apparatus is designated schematically by block 506. The transceiver apparatus 506 may be provided for example by means of a radio part and associated antenna arrangement. The antenna arrangement may be arranged internally or externally to the device.

A device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the device by means of a suitable user interface such as key pad 505, voice commands, touch sensitive screen or pad, combinations thereof or the like. A display 508, a speaker and a microphone can be also provided. Furthermore, a communication device may comprise appropriate connectors (either wired or wireless) to other devices and/or for connecting external accessories, for example hands-free equipment, thereto.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). Reference to device to device communication may be found in the 3GPP release 12 and beyond.

Figure 6:
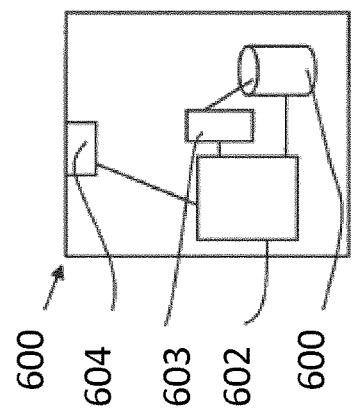
FIG. 6 shows an example of a control apparatus.

FIG. 6 shows an example of a control apparatus. The control apparatus comprises at least one memory 601, at least one data processing unit 602, 603 and an input/output interface 604. Via the interface the control apparatus can be coupled to receive and/or transmit data. For example the control apparatus can be configured to execute an appropriate software code to provide the control functions. The control apparatus may be an access node, for example a base station, base transceiver station and/or enhanced base station (eNodeB).

In the foregoing an access node serving the Tx UE and an access node serving the Rx UE have been discussed. It will be appreciated that an access node serving a UE is an access node providing a cell or coverage area within which the UE is. In other words, if a UE is in a coverage area of an access node, the access node may be considered to be serving that UE.

In the foregoing a Tx UE and Rx UE have been described as being in a device to device communication range of each other. A Tx UE and a Rx UE that are able to communicate with each other in device to device communications are considered to be within range of each other. It will be appreciated that the UEs may not be within a same cell and at least one of the UEs may be located at a cell edge.

In the foregoing we have referred to the scheduling or provision of resources for device to device communications. It will be appreciated that the resources may refer to any signalling resources, for example a frame, time period, frequency, carrier and or any other resource that may be used to transmit and/or receive data from another device.

The invention claimed is:

1. An apparatus, comprising:
   at least one processor; and
   at least one memory including computer program code,
   wherein the at least one memory and computer program code are configured to, with the at least one processor, cause the apparatus at least to
   receive a release message from a first user equipment for releasing resources related to a device-to-device communication; and
   send control information indicating that a device-to-device communication mode is no longer active to at least one second user equipment in response to the release message to trigger the at least one second user equipment at least to stop monitoring a resource or a resource pool.

2. The apparatus of claim 1, wherein the control information comprises an indication that the device-to-device communication mode is active.

3. The apparatus of claim 2, wherein the at least one memory and computer program code are further configured to, with the at least one processor, cause the apparatus at least to
   send the control information in response to receiving a request to schedule a resource for the device-to-device communication.

4. The apparatus of claim 1, wherein the control information comprises an indication that the device-to-device communication mode is inactive.

5. The apparatus of claim 1, wherein the control information comprises an indication of a resource or a resource pool to be monitored by the at least one second user equipment.

6. The apparatus of claim 1, wherein the at least one memory and computer program code are further configured to, with the at least one processor, cause the apparatus at least to
send a resource allocation to the first user equipment when the release message comprises a request to schedule a resource for device-to-device communication.

7. The apparatus of claim 1, wherein the at least one memory and computer program code are further configured to, with the at least one processor, cause the apparatus at least to
send a status information to the first user equipment in response to receiving a request to schedule a resource for device-to-device communication, wherein the status information is indicative of when the first user equipment is allowed to send a scheduling assignment.

8. The apparatus of claim 1, wherein the at least one memory and computer program code are further configured to, with the at least one processor, cause the apparatus at least to
determine whether the device-to-device communication mode is active within a range of the at least one second user equipment and send the control information based on the determination.

9. An apparatus, comprising:
at least one processor; and
at least one memory including computer program code,
wherein the at least one memory and computer program code are configured to, with the at least one processor, cause the apparatus at least to
receive control information from a network node relating to whether a device-to-device communication mode is active; and
monitor a resource or a resource pool based on the received control information,
wherein the control information comprises an indication that the device-to-device communication mode is active or inactive, and
wherein the at least one memory and computer program code are further configured to, with the at least one processor, cause the apparatus at least to stop monitoring the resource or the resource pool when the control information comprises the indication that the device-to-device communication mode is inactive.

10. The apparatus of claim 9, wherein the at least one memory and computer program code are further configured to, with the at least one processor, cause the apparatus at least to
start monitoring the resource or the resource pool when the control information comprises the indication that the device-to-device communication mode is active.

11. The apparatus of claim 9, wherein the control information comprises an indication of a resource or a resource pool to be monitored.

12. The apparatus of claim 9, wherein the at least one memory and computer program code are further configured to, with the at least one processor, cause the apparatus at least to
receive a scheduling assignment from a device-to-device user equipment on the resource or on the resource pool.

13. A method comprising
receiving a release message from a first user equipment for releasing resources related to a device-to-device communication; and
sending control information indicating that a device-to-device communication mode is no longer active to at least one second user equipment in response to the release message to trigger the at least one second user equipment at least to stop monitoring a resource or a resource pool.

14. The method of claim 13, wherein the control information comprises an indication that the device-to-device communication mode is active.

15. The method of claim 14, further comprising
sending the control information in response to receiving a request to schedule a resource for the device-to-device communication.

16. The method of claim 13, wherein the control information comprises an indication that the device-to-device communication mode is inactive.

* * * * *